United States Patent [15] 3,690,338

Swartz [45] Sept. 12, 1972

[54] ONE SHOT FLUID GATE

[72] Inventor: Elmer L. Swartz, Annandale, Va.

[73] Assignee: The United States of America as represented by the Secretary of the Army

[22] Filed: Jan. 21, 1971

[21] Appl. No.: 108,542

[52] U.S. Cl. ....................................137/81.5
[51] Int. Cl. ..............................F15c 1/08, F15c 4/00
[58] Field of Search .................................137/81.5

[56] References Cited

UNITED STATES PATENTS

| | | | |
|---|---|---|---|
| 3,295,543 | 1/1967 | Zalmanzon | 137/81.5 |
| 3,478,764 | 11/1969 | Trask et al. | 137/81.5 |
| 3,204,652 | 9/1965 | Bauer | 137/81.5 |
| 3,472,225 | 10/1969 | Burns | 137/81.5 X |
| 3,512,557 | 5/1970 | Brear | 137/81.5 |
| 3,513,868 | 5/1970 | Halbach et al. | 137/81.5 |

*Primary Examiner*—Samuel Scott
*Attorney*—Harry M. Saragovitz, Edward J. Kelly, Herbert Berl and Saul Elbaum

[57] ABSTRACT

A device having an input channel, a receiver channel, and a dump channel communicating with a reaction chamber wherein an input signal of any duration supplied to the input channel will cause only a single narrow pulse at the output of the receiver channel. After the termination of the narrow pulse the one shot gate isolates the flow entering the input channel from the receiver channel by dumping any continuing flow in the input channel to the atmosphere.

6 Claims, 2 Drawing Figures

INVENTOR.
ELMER L. SWARTZ
BY Harry M. Saragovitz
Edward J. Kelly
Herbert Berl
Saul Elbaum

ONE SHOT FLUID GATE

DEDICATORY CLAUSE

The invention described herein may be manufactured, used or licensed by or for the Government for governmental purposes without the payment to me of any royalty thereon.

BACKGROUND OF THE INVENTION

This invention relates to fluid gates and particularly to a one shot fluid gate wherein a fluid input signal will in turn produce a single pressure pulse through the output channel. No further pulses will flow from the signal output channel until all flow ceases to the input channel and a new input signal is introduced.

There has long been a need for a fluidic device which would enable one fluid device to control another fluid device and yet have the two fluid devices isolated one from the other. Should the two fluid devices truely be isolated one from the other, then after an initial control output, the condition in the second fluid device may be changed without affecting the first fluid device and, also, the changed position of the second fluid device is not affected by the continuing output from the first fluid device.

At present, when isolation between two devices is required, as in the above case, it is necessary to use several "NOR" units to do the job. A "NOR" unit is active and requires power. The present invention is small, only one is required to perform the function and no additional power is required.

It is an object of this invention to provide a one shot fluid gate to receive a fluid input signal and in turn produce a single pressure pulse through its output channel, any continuing input signal flow being exhausted at a different port.

It is a further object of this invention to provide a one shot fluid gate wherein no further pulses will flow from the signal output channel until all flow ceases to the input channel and a new input signal is introduced.

Yet another object of this invention is to provide a one shot fluid gate wherein the duration of the pressure pulse through its output channel may be varied.

SUMMARY OF THE INVENTION

The one shot fluid gate is composed of an input channel which is axially aligned with an output channel, receiver channel, and a dump channel. Entrainment channels may be used to necessitate a clean switch of the fluid flow. As the input signal stream emerges from the input channel into the interaction region connecting the input channel, the receiver channel and the dump channel, the initial flow will encounter some difficulty in attaching to the boundary wall of the dump channel, causing a slight delay in attachment. Until the stream has attached to the wall of the dump channel, the flow will be straight ahead where the receiver channel captures a pulse of some magnitude and time duration. After boundary layer lock-on, any continuing flow is through the dump to atmosphere. In order to obtain another output pulse, the input signal must be removed and reapplied.

One to two milliseconds or more delay in attachment of the flow to the wall of the dump channel may be obtained by varying the angle at which the dump channel curves away from the flowing signal, by varying the wall length of the atmospheric dump, and by making the dump channel only large enough to receive exactly all of the expanding fluid stream.

DESCRIPTION OF THE PREFERRED EMBODIMENT

Figure 1:
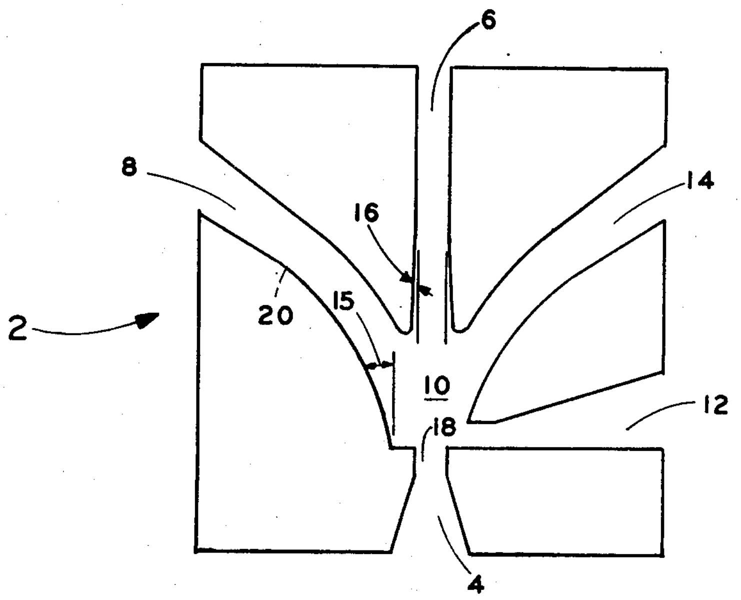
FIG. 1 is a schematic view of the present invention.

Referring to FIG. 1, input channel 4, receiver (output) channel 6, and dump channel 8 communicate with reaction chamber 10. Input channel 4 is axially aligned with receiver channel 6. Dump channel 8 is off-set from nozzle 18 and curves away from the axis of the input channel and thus the direction of flow of the input signal. The one shot fluid gate 2 is made up of a flat plate which has the various channels cut into it. These channels could be drilled or formed to have any configuration. They do not have to be rectangular. The present invention is constructed to be fluid-tight except for the outputs at the ends of the various channels. The particular manner in which the present invention is assembled or manufactured is not pertinent.

A fluid input signal entering reaction chamber 10 through nozzle 18 will produce a single pressure pulse through receiver channel 6. The fluid stream will then attach itself to the wall of dump channel 8 and will exhaust to the atmosphere. No further pulses will flow from the signal output channel 6 until all flow ceases to the input channel and a new input signal is introduced. As the input signal stream emerges from the input channel 4 into the interaction region of the reaction chamber 10, the initial flow will encounter some difficulty in attaching to the boundary wall of the dump channel.

There will be a slight delay in attachment of the flowing signal to the wall of the dump channel determined by the particular construction of the dump channel. The wall 20 of dump channel 8 is curved away from the flowing signal to thus make attachment thereto by the flowing stream more difficult. The wall length to the atmospheric dump in terms of nozzle width is made short which adds to the difficulty of attachment. As an example, the wall length would be made 5 to 6 times the width of nozzle 18. The dump channel is only large enough to receive exactly all of the expanding fluid stream. The selected dimension of the dump channel makes the device load sensitive because it is just the proper size to exactly receive all of the flow of the expanding fluid stream. Any further narrowing of the dump channel would cause flow in the receiver channel 6 anytime there is flow in the dump channel. All of the above factors combined can retard the attachment of the fluid stream to boundary 20 of dump channel 8 for 1 or 2 milliseconds or more.

To enable the one shot gate to make a cleaner switch, entrainment channels 12 and 14 may be provided. The present invention will function with the entrainment channels closed, however, a cleaner switch is obtained with their use. With these channels closed the device will experience some distortion of the pulse in the receiver channel.

An input pulse of any duration supplied to input channel 4 will produce only a single narrow pulse at the output of receiver channel 6. The output pulse is capable of switching another fluid device. The flow, if any, continuing after the termination of the short pulse will be exhausted to the atmosphere. The pulse is, of course, terminated by boundary layer lock-on of the fluid flow to the dump channel. No further pulses will flow from the signal output channel 6 until all flow ceases to input channel 4 and a new input signal supplied thereto. Upon reapplying an input signal to input channel 4, the cycle will repeat. A single pressure pulse will be produced at the output of receiver channel 6 and then all flow entering reaction chamber 10 through nozzle 18 will be dumped to the atmosphere through dump channel 8.

Figure 2:
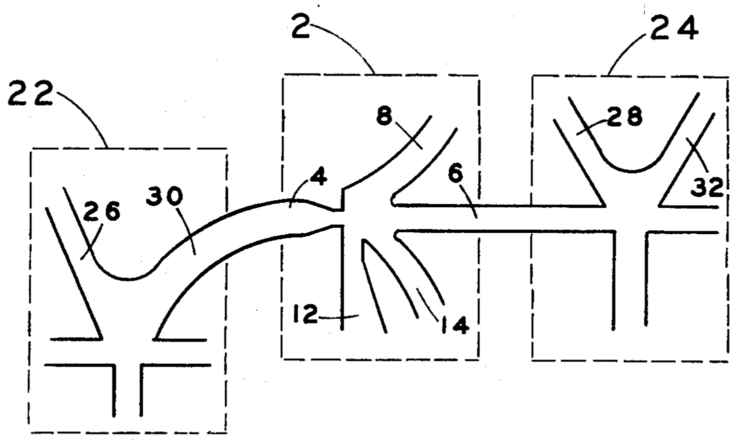
FIG. 2 shows the present invention being used to connect two fluid devices together whereby the first device is isolated from the second device.

A particular embodiment of one shot gate 2 is shown in FIG. 2. One shot gate 2 is connected between the two other fluid devices, amplifiers 22 and 24. One shot gate 2 is connected to be responsive to the output of device 22 and has its receiver channel 6 connected to the control channel of device 24. Initially, the stream is out channel 26 and 28 of devices 22 and 24, respectively. When device 22 switches so that the flow is through channel 30, an output pulse will be experienced through channel 6 of one shot gate 2. The pressure wave produced by the one shot gate produces a pressure wave that causes device 24 to switch so that its flow is through channel 32. Following the pressure pulse or wave, the entire flow from one shot gate 2 is exhausted to the atmosphere through dump channel 8.

The novel result of the one shot gate is that it isolates two devices from each other once the initial pulse has ceased. For example, when the signal flow in device 24 is switched from channel 32 back to channel 28, the continuing flow in dump channel 8 of one shot gate 2 is unaffected and so is the flow in device 22. It will also be noted that the removal of the signal flow from device 22 or the switching of the flow therein from channel 30 back to channel 26 will not cause any change in the flow in device 24. Device 24 will remain in a stable condition, unaffected by the flow in devices 22 and 2 until the flow in device 2 is removed and reapplied to once again obtain an output pressure wave or pulse therefrom.

One shot gates may be constructed with many desireable parameters. The delayed attachment of the flow into the dump channel may be varied as previously disclosed. The dump channel may assume an angle 15 of 17° to 25°. A typical width would be 0.055 inches with an off set or set back of 0.013 inches. A typical nozzle width would be 0.032 inches. Entrainment channel 14 is set back 0.045 inches at an angle of 15° while entrainment channel 12 exits horizontally for 0.015 inches before diverging to the atmosphere. Receiver channel 6 is typically 0.037 inches wide and flares as it approaches reaction chamber 10 by 3° at angle 16. It should be noted that the walls of dump channel 8 and entrainment channel 14 diverge, entrainment channel 14 having a much longer wall length than dump channel 8. These values are exemplary only and the present invention is in no way intended to be limited thereby. It is obvious that the present invention may be used in many varied configurations of fluidic devices.

I claim:

1. A one shot fluid gate comprising an input channel, a receiver channel, and a dump channel connecting into a reaction chamber, said input and receiver channels being axially aligned and wherein an input signal of any duration at said input channel will cause only a single narrow pulse at the output of said receiver channel after which said one shot gate isolates the flow entering said input channel from said receiver channel by dumping said fluid flow to the atmosphere.

2. A one shot fluid gate as set forth in claim 1 wherein the flow entering said input channel is isolated from said receiver channel by said flow proximately attaching to the wall of said dump channel and subsequently being dumped to the atmosphere through said dump channel.

3. A one shot fluid gate as set forth in claim 2 wherein said dump channel is set back from said input channel and curves away from the direction of flow of said input signal to obtain a desired delay before said input signal attaches to the wall of said dump channel.

4. A one shot fluid gate as set forth in claim 3 further comprising a nozzle connecting said input channel to said reaction chamber and wherein the length of the wall of said dump channel to the atmospheric dump is small with respect to the width of said nozzle to further delay attachment of said input signal to said wall of said dump channel.

5. A one shot fluid gate as set forth in claim 4 wherein said dump channel is only large enough to receive all said input signal.

6. A one shot fluid gate as set forth in claim 5 further comprising a plurality of entrainment channels communicating with said reaction chamber, said entrainment channel being set back in a direction opposite the direction of the set back of said dump channel, said entrainment channels permitting entrainment for a clean switch of said input signal into said dump channel.

* * * * *